(12) United States Patent
Kellhammer et al.

(10) Patent No.: US 10,802,693 B2
(45) Date of Patent: Oct. 13, 2020

(54) OPERATING SYSTEM FOR A CONTAINER HANDLING MACHINE, AN OPERATING DEVICE AND A SEPARATE ADDITIONAL SCREEN

(71) Applicant: KRONES AG, Neutraubling (DE)

(72) Inventors: Thomas Kellhammer, Neutraubling (DE); Josef Paulus, Neutraubling (DE)

(73) Assignee: KRONES AG, Neutraubling (DE)

( * ) Notice: Subject to any disclaimer, the term of this patent is extended or adjusted under 35 U.S.C. 154(b) by 34 days.

(21) Appl. No.: 14/358,421

(22) PCT Filed: Sep. 13, 2013

(86) PCT No.: PCT/EP2013/069018
§ 371 (c)(1),
(2) Date: May 15, 2014

(87) PCT Pub. No.: WO2014/044608
PCT Pub. Date: Mar. 27, 2014

(65) Prior Publication Data
US 2015/0212718 A1    Jul. 30, 2015

(30) Foreign Application Priority Data

Sep. 19, 2012  (DE) .................. 10 2012 216 770

(51) Int. Cl.
*G05B 19/409*  (2006.01)
*G06F 3/0482*  (2013.01)
*G06F 3/0484*  (2013.01)

(52) U.S. Cl.
CPC ....... *G06F 3/04847* (2013.01); *G05B 19/409* (2013.01); *G06F 3/0482* (2013.01);
(Continued)

(58) Field of Classification Search
CPC ............. G06F 3/04847; G06F 3/04842; G06F 3/0482; G05B 19/409; G05B 2219/24019;
(Continued)

(56) References Cited

U.S. PATENT DOCUMENTS 9,258,434 B1 * 2/2016 Landry .............. H04N 1/00148
2003/0009710 A1 * 1/2003 Grant .................... G05B 19/19
714/37
(Continued)

FOREIGN PATENT DOCUMENTS

DE    112005001152 T5    6/2007
EP       2019347 A1    1/2009
(Continued)

OTHER PUBLICATIONS

Search Report for DE 10 2012 216 770.6, dated Mar. 25, 2013.
International Search Report for PCT/EP2013/069018, dated Nov. 28, 2013.

*Primary Examiner* — Daniel W Parcher
(74) *Attorney, Agent, or Firm* — Marshall, Gerstein & Borun LLP (57) ABSTRACT

An operating system for a container handling machine, including an operating device for the container handling machine having a screen and a data transmitter for transmitting information and at least one separate additional screen having a data receiver for receiving information, with the operating device designed for selecting the information and the additional screen designed for displaying the selected information.

17 Claims, 4 Drawing Sheets

(52) U.S. Cl.
CPC ............... *G06F 3/04842* (2013.01); *G05B 2219/23043* (2013.01); *G05B 2219/23406* (2013.01); *G05B 2219/24019* (2013.01); *G05B 2219/36133* (2013.01); *G05B 2219/36159* (2013.01); *G05B 2219/36163* (2013.01)

(58) Field of Classification Search
CPC ........... G05B 2219/23406; G05B 2219/23043; G05B 2219/36133; G05B 2219/36163; G05B 2219/36159
See application file for complete search history.

(56) References Cited

U.S. PATENT DOCUMENTS

| | | | | |
|---|---|---|---|---|
| 2004/0046805 A1* | 3/2004 | Brand | ................ | G06F 3/04815 715/848 |
| 2006/0074777 A1* | 4/2006 | Anderson | ............ | G06Q 10/087 705/28 |
| 2007/0247800 A1* | 10/2007 | Smith | ................ | B60R 11/0252 361/679.02 |
| 2008/0065243 A1* | 3/2008 | Fallman | ............... | G05B 19/409 700/83 |
| 2009/0044876 A1* | 2/2009 | Doglioni Majer | ...... | G07F 13/10 141/1 |
| 2009/0254861 A1* | 10/2009 | Seetharamakrishnan | ................... | G11B 27/34 715/810 |
| 2010/0030355 A1* | 2/2010 | Insolia | ............... | G06Q 30/0601 700/97 |
| 2010/0228390 A1* | 9/2010 | Hudis | ................... | G07F 11/002 700/241 |
| 2010/0235240 A1* | 9/2010 | Park | ..................... | G06Q 20/123 705/14.61 |
| 2010/0290084 A1 | 11/2010 | Russell, III et al. | | |
| 2011/0137447 A1* | 6/2011 | Hermann | ........... | G05B 23/0251 700/108 |
| 2012/0239189 A1* | 9/2012 | Jaud | ....................... | G07F 9/023 700/236 |
| 2013/0127404 A1* | 5/2013 | Maenpaa | ................ | H02J 7/025 320/108 |

FOREIGN PATENT DOCUMENTS

| | | | | |
|---|---|---|---|---|
| EP | 2224295 A1 | 9/2010 | | |
| EP | 2306254 A1 | 4/2011 | | |
| JP | 11191178 A | * | 7/1999 | ............ G07F 13/02 |
| WO | WO-2011120624 A1 | 10/2011 | | |

* cited by examiner

OPERATING SYSTEM FOR A CONTAINER HANDLING MACHINE, AN OPERATING DEVICE AND A SEPARATE ADDITIONAL SCREEN

CROSS-REFERENCE TO RELATED APPLICATION

The present application is the United States national phase of International Patent Application No. PCT/EP 2013/069018, filed Sep. 13, 2013, which application claims to German Application No. 10 2012 216 770.6, filed Sep. 19, 2012. The priority application is hereby incorporated by reference.

FIELD OF THE DISCLOSURE

An operating system for a container handling system, such as for container production and beverage processing operations.

BACKGROUND

Usually, a user of beverage processing plants operates the individual container handling machines via an operating system. Here, stationary HMI (Human Machine Interface) operating devices with a screen which are firmly mounted to the respective machine are mainly employed. With the operating system, for example, individual processes in the machine may be triggered, parameters set, and/or alarm or warning signals received. Furthermore, such operating systems may include documents with operating and/or maintenance instructions of the respective machine where the user may look for assembly procedures, for example.

In a maintenance operation, various information are moreover indicated to the user, for example type-dependent adjustment values or tightening torques for individual screws. The user will then normally read the information from the screen and note them down on a leaflet because the screen itself cannot be read or seen from every region of the machine. The user may then properly perform the operation processes on site with reference to the information on the leaflet.

Such operating systems have a disadvantage in that the manual noting down of said information is tedious and prone to errors. The user himself must select the information in such a manner that he will then have all required information at hand when he is working at the container handling machine. In the process, he might forget to copy individual information and must, as a consequence, walk back to the operating device. This is correspondingly cumbersome and time-consuming. Moreover, the user must gather the information from individual selection screens, documentations and operating instructions with this procedure.

SUMMARY OF THE DISCLOSURE

It is an aspect of the present disclosure to provide an operating system for a container handling machine which is less prone to errors and easier to handle.

In one embodiment the operating system for a container handling machine may include an operating device for the container handling machine with a screen and a data transmitter for transmitting information, and at least one separate additional screen having a data receiver for receiving the information, the operating device being designed for selecting the information and the additional screen for displaying the selected information.

By the operating device being designed for selecting the information, those information that are required by the user during maintenance may be correspondingly selected. Subsequently, the selected information may be transmitted with the data transmitter of the operating device to the data receiver of the separate additional screen and be displayed on the latter. The information will then correspondingly be displayed to the user via said separate additional screen on site at the machine, so the user does not need a leaflet for writing down the information any more. It is thus moreover possible to retrieve different pages of information on the additional screen without writing down notes on a multitude of leaflets and carrying them along.

The container handling machine may be arranged in a beverage processing plant. The container handling machine may be, for example, a stretch-blow machine, a rinser, a filler, a closer, a labeling machine and/or a packaging machine, or any other container handling machine. The container handling machine may include a computer-based machine control. The operating device may be a HMI (Human Machine Interface) operating device. The operating device may have an input unit, in particular a keyboard, control knobs, and/or an indicating device (mouse, trackball) for selecting the information. The operating device may be designed as stationary or mobile operating device. "Stationary" can mean that the operating device is disposed directly at the container handling machine.

The information may include a mechanical adjustment value (heights, distances), a torque, a sequence of the installation and deinstallation operations of an accessory, a mark of a component, a coding of a component, a service note, a change interval, a short text, an operational life of a component, a general note, a documentation and/or operating instructions. The mechanical adjustment values may in particular depend on types. Type-dependence can mean that these depend on a type of beverage.

The selection of information can mean that the information may be selected by a user at the screen of the operating device and/or via the input unit. The selection of information can also mean that the operating device is designed for selecting the information automatically, in particular by software. The information may be selectable by a remote maintenance system.

The data transmitter and the data receiver may be connected to each other for transmitting the information by a cable, a system bus, via infrared or radio.

For displaying the selected information, the additional screen may comprise an LCD display or a TFT display. In particular, the additional screen may be designed for displaying graphical information.

The additional screen for displaying the selected information may comprise a display unit with electronic paper. Thereby, the additional screen may be designed to be particularly energy-saving and inexpensive. The electronic paper may comprise bistable display elements (pixels) and be in particular designed as reflective display where ambient light is used for illumination. Due to this, the additional screen does not need any illumination unit for lighting the screen from behind. The electronic paper may be a so-called e-paper, e-Ink, or e-paper display. The electronic paper may be embodied with electrophoresis, with a bistable LCD (e. g. Cholesteric Liquid Chrystal Display), with electrowetting or with micromechanically controlled interference modulation.

The electronic paper may be designed such that it needs energy only for changing the display.

The screen of the operating device may be designed to be touch-sensitive for the user's input, in particular for selecting information. Thereby, a user may select the information particularly easily directly by touching the monitor. The touch-sensitive screen may be designed for displaying virtual knobs for selecting individual information on the screen.

The data transmitter and the data receiver may be designed with a radio interface each for the wireless transmission of information. Thereby, the data transmitter and the data receiver may be interconnected by radio according to a standardized method. The radio interface may in particular be a WLAN or BLUETOOTH interface. The data transmitter and the data receiver may be incorporated in a radio network.

The additional screen may comprise a battery for power supply. Thereby, power supply may be effected without cable and independent of other systems.

The operating device may comprise information templates for automatically selecting information, where said information are in particular formed of different types of information and wherein a hierarchic arrangement of the types of information is stored in each of the information templates. Thereby, a preselection of certain information may be stored in the operating device as information template and retrieved by the user at a later point in time, so that the information stored therein is automatically selected. Here, the types of information may be references to information which are automatically updated and by which in particular the information may be read out from a machine control of the container handling machine. The types of information may be characterizations for certain information. For example, one type of information may be a certain type-dependent adjustment value for an assembly in the container handling machine (e. g. its height). In the hierarchic arrangement, individual types of information, in particular with respect to a certain assembly, may be arranged in at least one group. The information templates may be stored in the memory of the operating device, in particular in the form of a list. The information templates may be alternatively stored in a memory of the additional screen.

The additional screen may be designed as mobile unit. Thereby, the additional screen may be carried along by the user independent of the operating device and be deposited in the region where the user carries out a maintenance or repair of the machine. The additional screen may have a thickness within a range of 2 mm to 15 mm, in particular within a range of 5 mm to 10 mm. Thereby, the additional screen is particularly flat and may be correspondingly easily carried along by the user at the machine.

The operating device and the additional screen may each comprise an induction coil for supplying the additional screen with energy when it receives the information and when the display is being updated, the induction coils being in particular designed as antennae for the wireless transmission of information, and the induction coil of the operating device being allocated to the data transmitter, and the induction coil of the additional screen being allocated to the data receiver. Thereby, the additional screen may be temporarily supplied with energy by the operating device to transmit information to the latter and update the display. Then, the additional screen will not require any separate source of energy for the display. The induction coil may be arranged directly at the operating device or at a distance to it at the container handling machine. Due to the fact that the induction coils may be designed as antennae for data transmission, it is easily possible to integrate the power supply of the additional screen with the data transmission via radio transmission.

The at least one additional screen may be arranged at an assembly of the container handling machine. This can mean that the container handling machine comprises different assemblies at each of which one additional screen is arranged. Information as to the respective assembly may be indicated on these additional screens. Thereby, a user does not have to carry the additional screen along but may read the required information directly on site at the assembly.

The present disclosure further provides a container handling machine, including the above-described operating system.

The present disclosure further provides a method for operating and/or monitoring a container handling machine, where information are selected at an operating device for the container handling machine comprising a screen, that information being transmitted with a data transmitter in the operating device to a data receiver in at least one separate additional screen, and that information being displayed on the additional screen.

By the information being selected at the operating device and transmitted with the data transmitter in the operating device to the data receiver in at least one separate additional screen and being displayed there, the user may select the required information and then read it on site during his/her work at the machine. Since the desired information are already stored in the operating device, these only have to be selected and transmitted to the additional screen. Accordingly, the user does not need any leaflet to write down the information, and work is accordingly facilitated. Moreover, said information may be transmitted to the additional screen without any errors by means of the method.

In the method, a user may, when selecting the information at the screen of the operating device, select individual types of information which are in particular texts, values and/or parameters. Thereby, the user may decide him-/herself which information are required for the respective procedures. The user may select the information and/or types of information via an input system, in particular via a keyboard, an indicating device, and/or a touch-sensitive screen. In a touch-sensitive screen, knobs may be displayed on the screen via which the user may decide whether the corresponding information is to be transmitted.

In the method, information templates containing each a hierarchic arrangement of types of information may be stored in the operating device, and a user may select at least one information template to automatically select said information with reference to the types of information stored therein. Thereby, the user does not have to select the individual information each time, but he may select already prepared information templates and then automatically transmit the information to the additional screen, for example for recurring operating sequences. Thereby, time may be saved in the selection of information.

In the method, a screenshot of the screen may be generated at the operating device when information are being selected. This particularly easily permits to transmit the information just being displayed at the operating device to the additional screen.

In the method, the user may, when selecting information, select documents from a list, the documents being in particular operating instructions, assembly instructions, and/or checklists Due to this, the user does not have to carry along the mentioned printed documents to the container handling machine but may view it at the additional screen. Thereby, the user is particularly well supported in his working operations.

For scrolling in documents or information forms, the user may use keys at the additional screen.

In the method, the selected information may be individual assembly information which are displayed at an assembly of the container handling machine with the additional screen. An additional screen each may be attached to several assemblies, where in particular the information relevant for the assembly are displayed. An assembly may be a motor, a control unit, a linear drive and/or a guiding segment.

BRIEF DESCRIPTION OF THE DRAWINGS

Further features and advantages of the disclosure will be illustrated below with reference to the embodiments represented in the Figures. In the figures.

DETAILED DESCRIPTION OF THE PREFERRED EMBODIMENT

Figure 1:
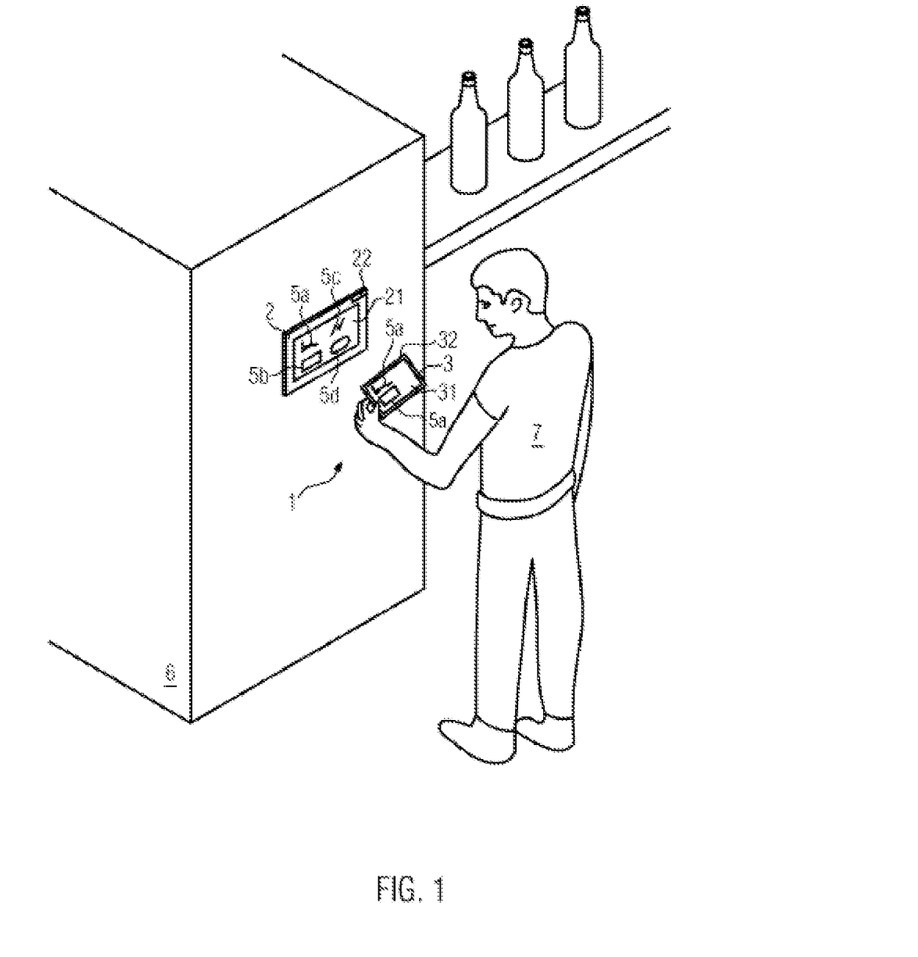
FIG. 1 shows a perspective representation of a container handling machine with a first embodiment of an operating system according to the disclosure.

FIG. 1 shows a perspective representation of a first embodiment of an operating system 1 according to the disclosure. Here, an operating device 2 is stationarily arranged at the container handling machine 6. The operating device 2 includes a data transmitter 22 by which selected information 5a, 5b may be transmitted to an additional screen 3 which contains a data receiver 32 for this. The additional screen 3 is mobile, so that the user 7 may take it in his hands to an assembly point at the container handling machine 6.

The operating device 2 is stationarily integrated at the side wall of the container handling machine 6 and connected to the machine control. The touch-sensitive screen 21 is used for the display and input, where information 5a, 5b, 5c, 5d may be displayed and via which software of the operating device 21 may be operated. For example, operating values of the container handling machine 6 may be viewed here, or the transport speed of a conveyor belt may be adjusted, for example. Moreover, a data transmitter 22 is arranged at the operating device and designed as a radio interface (for example WLAN or BLUETOOTH). With the radio interface, the operating device 2 may on the one hand receive radio signals of other plant units and also transmit the information 5a, 5b, 5c, 5d to the additional screen 3.

The data receiver 32 is arranged at the additional screen 3 and also designed as a radio interface. By this, it may receive the information 5a, 5b, 5c, 5d from the operating device 2. One can also see that the selected information 5a and 5b are displayed on the display unit 31 of the additional screen 3. Thus, the user 7 may take the additional screen to any place he likes.

Figure 2:
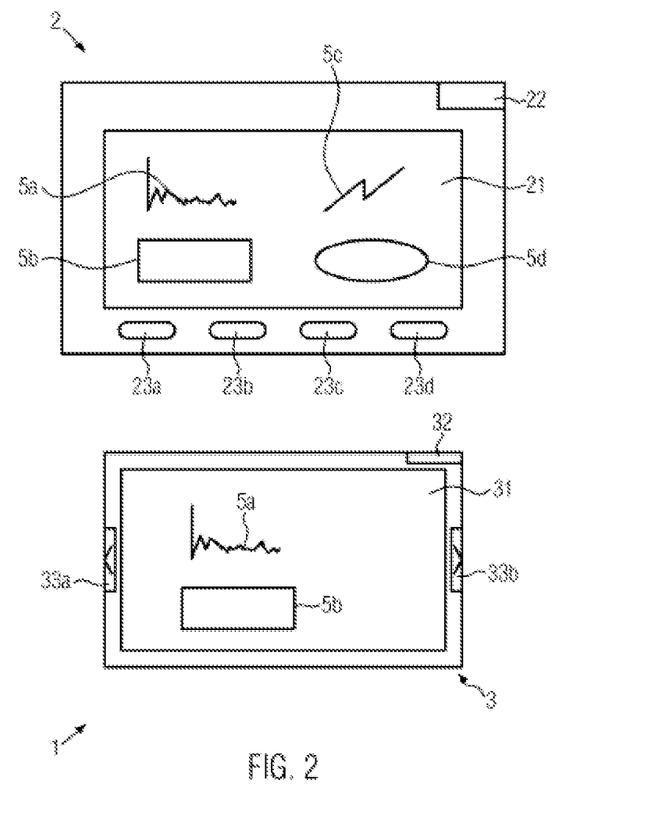
FIG. 2 shows a front view of the operating system according to the disclosure shown in FIG. 1.

FIG. 2 shows the operating system 1 of FIG. 1 in a front view. In the upper region, one can see the operating device 2 on which the information 5a, 5b, 5c and 5d are shown more in detail on the screen 21. By tapping on the individual information 5a, 5b, 5c, 5d, the user may select them to transmit them to the additional screen 3. For example, the information 5a and 5b are selected here. For example, information 5a may be a motor operation characteristic, and information 5b may be a certain adjustment value for a motor. Moreover, at the lower edge of the operating device 2, several functional keys 23a, 23b, 23c and 23d are arranged via which one may easily access software functions of the operating device 2. By pressing the key 23a, a screenshot of the current screen content of the operating device 2 may be generated. Via the data transmitter 22, now the selected information 5a and 5b and the screenshot may be transmitted to the additional screen 3.

In the lower region of FIG. 2, the additional screen 3 can be seen on which the information 5a and 5b are displayed. The additional screen 3 contains electronic paper as a display unit 31 on which the display is shown in a particularly energy-saving manner. Moreover, the additional screen 3 contains a battery for the power supply of the additional screen 3 (not represented here).

Moreover, the keys 33a and 33b which permit to switch between the screen contents are shown at the additional screen 3. Here, different information levels may be displayed, documents may be displayed, and/or one may scroll through the documents. Thereby, the user 7 may easily leaf through the operating instructions and take additional information directly to the assembly site.

In an alternative embodiment, the operating device 2 contains an induction coil in the data transmitter 22, and the additional screen 3 contains an induction coil in the data receiver 32. When information 5a, 5b are received with the data receiver 32 and updated on the display unit 31, energy is temporarily transmitted from the operating device to the additional screen 3 by induction. As soon as the information 5a, 5b, are transmitted, they are permanently displayed by means of the electronic paper without any further power supply. Thus, the additional screen 3 does not have to have a separate power supply.

Figure 3:
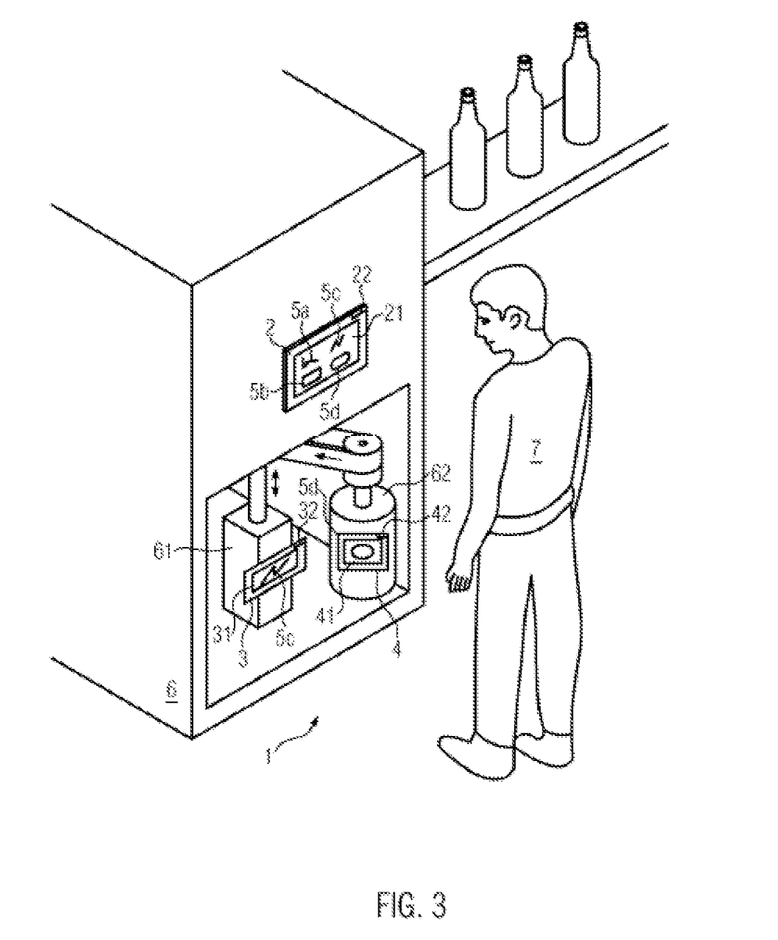
FIG. 3 shows a perspective representation of a second embodiment of the operating system according to the disclosure.

FIG. 3 shows a perspective representation of a second embodiment of the operating system 1 according to the disclosure. One can see a container handling machine 6 at which the operating device 2 is stationarily arranged. Moreover, an opening through which two assemblies are visible is shown in the lower region of the container handling machine 6. The first assembly is a linear motor 61 on which an additional screen 3 is arranged. Moreover, a motor 62 is shown as a second assembly at which the additional screen 4 is arranged and which drives a conveyor belt via a belt.

The user 7 may select various information 5a, 5b, 5c and 5d on the screen 21 of the operating device 2 and transmit them with the data transmitter 22 to the additional screens 3 and 4. The additional screens 3, 4 each contain a data receiver 32, 42 which is each equipped with a radio interface. On the display 31 of the additional screen 3, the information 5c are displayed. On the display unit 41 of the additional screen 4, the information 5d are displayed.

Figure 4:
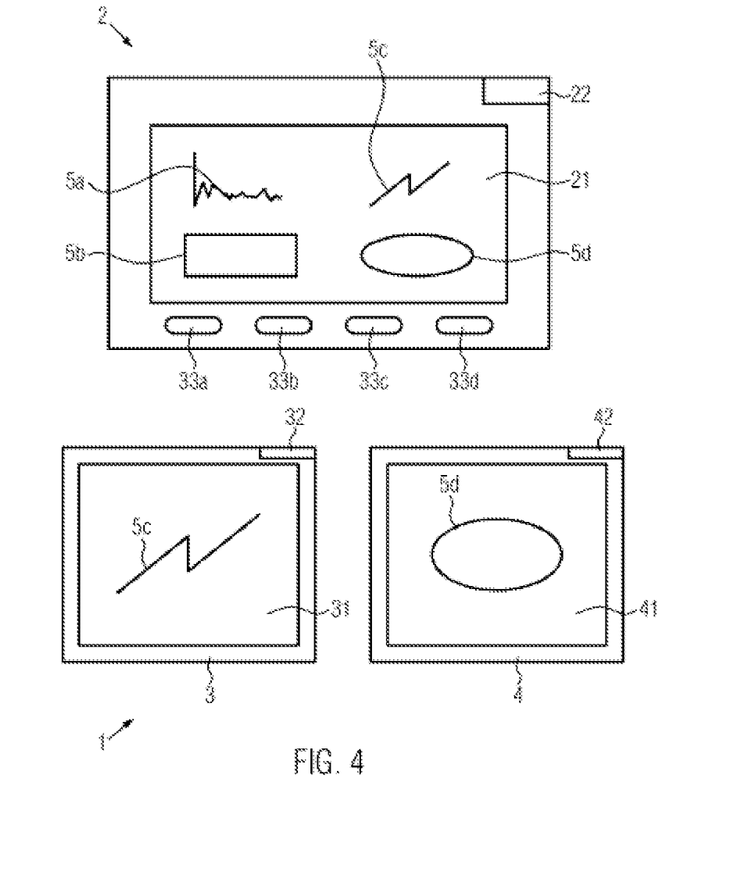
FIG. 4 shows a front view of the operating system shown in FIG. 3.

FIG. 4 shows the operating system 1 of FIG. 3 more in detail in a front view. On the screen 21 of the operating device 2, the information 5a, 5b, 5c and 5d are displayed. Here, for example information 5c shows a desired curve of the linear motor 61, and information 5d shows a desired speed of the motor 62. The user 7 may here select various information templates via the keys 33a, 33b, 33c and 33d by means of which the desired information may be selected automatically. The information templates contain a hierarchic arrangement of types of information which each access certain values, operating parameters, etc. When the corresponding keys 33a, 33b, 33c or 33d are actuated, a certain information template is selected and the corresponding information are automatically updated via the types of information stored therein. The information 5c, 5d selected in this manner are then transmitted to the additional screens 3 and 4 via the data transmitter 22.

The additional screen 3 includes the data receiver 32 by which the information 5c sent by the operating device 2 may be received. Upon receipt of the information 5c, the latter are displayed on the display unit 31. The display unit 31 is here designed either as electronic paper or as LCD display. A battery (not represented here) serves as power supply. As an alternative, the additional screen may receive and display several information 5a, 5b, 5c, 5d.

The additional screen 4 equally contains a data receiver 42 by which information 5d may be received from the operating device 2. Said information are subsequently displayed on the display unit 41 which is also designed as electronic paper or as LCD display. The additional screen 4 may also receive and display several information 5a, 5b, 5c, 5d.

Thereby, the user 7 may view the information 5c, 5d on site at the respective assembly and does not have to hold the additional screen with one hand nor carry along a leaflet. Moreover, with the operating system and method according to the disclosure, it is excluded that the information 5a, 5b, 5c, 5d are transmitted inaccurately to the additional screen 3, 4.

It will be understood that features mentioned in the above described embodiments are not restricted to these special combinations and are also possible in any other combinations.

The invention claimed is:

1. An operating system for a container handling machine, comprising:
   an operating device for the container handling machine, the container handling machine comprising at least one of a stretch-blow machine, a rinser, a closer, a labeling machine, and a packaging machine, the operating device stationarily arranged at the container handling machine, connected to a container handling machine control, and comprising a screen, an input unit, and a data transmitter for transmitting information;
   a first separate additional screen, the first additional screen being arranged on a first sub-assembly of the container handling machine and comprising a first data receiver for receiving the information from the operating device; and
   a second separate additional screen, the second additional screen being arranged on a second sub-assembly of the container handling machine, different from the first sub-assembly, and comprising a second data receiver for receiving the information from the operating device; wherein
   the operating device is configured to receive a selection of an information template associated with first information regarding the first sub-assembly and second information associated with the second sub-assembly with at least one of the screen or the input unit, the first and second information comprising at least one of information regarding the operation of the container handling machine or information regarding the maintenance of the container handling machine, and in response to receiving the selection, to transmit the first information with the data transmitter to the first data receiver of the first additional screen and to transmit the second information with the data transmitter to the second data receiver of the second additional screen;
   the first additional screen is configured to display the first information received with the first data receiver, without displaying the second information, in response to receiving the first information; and
   the second additional screen is configured to display the second information received with the second data receiver, without displaying the first information, in response to receiving the second information.

2. The operating system according to claim 1, wherein at least one of the first and second additional screens comprises, for displaying the first or second information, a display unit with electronic paper.

3. The operating system according to claim 1, wherein the screen of the operating device is designed to be touch-sensitive for a user's input.

4. The operating system according to claim 3, wherein the user's input is for selecting the information template.

5. The operating system according to claim 1, wherein the data transmitter and the first and second data receivers are designed each with a radio interface for wireless transmission of the information.

6. The operating system according to claim 1, wherein at least one of the first and second additional screens comprises a battery for power supply.

7. The operating system according to claim 1, wherein the operating device comprises a plurality of information templates for automatically selecting the first information and the second information.

8. The operating system according to claim 7, wherein the information templates are formed from different types of information and a hierarchical arrangement of the types of information.

9. The operating system according to claim 1, wherein the operating device and the first and second additional screens each comprise an induction coil to supply the first and second additional screens with energy when the first and second additional screens are receiving the information and updating the display.

10. The operating system according to claim 9, wherein the induction coils are designed as antennae for wireless transmission of the information, and the induction coil of the operating device is allocated to the data transmitter, and the induction coil of the first and second additional screens is allocated to the first and second data receivers.

11. A method for operating and/or monitoring a container handling machine, comprising:
    receiving, at an operating device, a selection of an information template associated with first information regarding a first sub-assembly of the container handling machine and second information regarding a second sub-assembly of the container handling machine, wherein the container handling machine comprises at least one of a stretch-blow machine, a rinser, a closer, a labeling machine, and a packaging machine, the operating device stationarily arranged at the container handling machine, connected to a container handling machine control, and comprising a screen and an input unit, and the information template is selected with at least one of the screen and the input unit, the first and second information comprising at least one of information regarding the operation of the container handling machine or information regarding the maintenance of the container handling machine;
    in response to receiving the selection, transmitting the first information with a data transmitter in the operating device to a first data receiver in a first separate additional screen, the first additional screen being arranged on the first sub-assembly of the container handling machine;

in response to receiving the selection, transmitting the second information with the data transmitter in the operating device to a second data receiver in a second separate additional screen, the second additional screen being arranged on the second sub-assembly of the container handling machine, different from the first sub-assembly of the container handling machine;

in response to receiving the first information and without displaying the second information, displaying the first information received with the first data receiver on the first additional screen, wherein the first information comprises individual information of the first sub-assembly and is displayed at the first sub-assembly of the container handling machine with the first additional screen; and in response to receiving the second information and without displaying the first information, displaying the second information received with the second data receiver on the second additional screen, wherein the second information comprises individual information of the second sub-assembly and is displayed at the second sub-assembly of the container handling machine with the second additional screen.

12. The method according to claim 11, wherein a user selects, when selecting the information template, individual types of information at the screen of the operating device.

13. The method according to claim 12, wherein the user selects, when selecting the information template, documents from a list.

14. The method according to claim 13, wherein the documents comprise operating instructions, assembly instructions, and/or checklists.

15. The method according to claim 12, wherein the first information and the second information is in texts, values, and/or parameters.

16. The method according to claim 11, wherein in the operating device, a plurality of information templates each containing a hierarchical arrangement of types of information are stored, and a user selects the information template to automatically select the first information and the second information.

17. The method according to claim 11, wherein in the selection of the information template, a screenshot of the screen is generated at the operating device.

* * * * *